US008685366B2

(12) United States Patent
Chaumonnot et al.

(10) Patent No.: US 8,685,366 B2
(45) Date of Patent: Apr. 1, 2014

(54) CRYSTALLIZED MATERIAL WITH HIERARCHICAL POROSITY CONTAINING SILICON

(75) Inventors: Alexandra Chaumonnot, Lyons (FR); Aurelie Coupe, Noisiel (FR); Clement Sanchez, Gif-sur-Yvette (FR); Cedric Boissiere, Paris (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 458 days.

(21) Appl. No.: 12/676,696

(22) PCT Filed: Aug. 29, 2008

(86) PCT No.: PCT/FR2008/001215
§ 371 (c)(1),
(2), (4) Date: Oct. 25, 2010

(87) PCT Pub. No.: WO2009/060143
PCT Pub. Date: May 14, 2009

(65) Prior Publication Data
US 2011/0033375 A1  Feb. 10, 2011

(30) Foreign Application Priority Data

Sep. 7, 2007 (FR) .................................. 07/06295

(51) Int. Cl.
*C01B 33/36* (2006.01)
*C01B 39/02* (2006.01)

(52) U.S. Cl.
USPC .......................................... 423/701; 423/700

(58) Field of Classification Search
None
See application file for complete search history.

(56) References Cited

U.S. PATENT DOCUMENTS

| 3,386,802 A * | 6/1968 | Michalko ....................... 423/701 |
| 2002/0016522 A1 * | 2/2002 | Vaughn et al. ................. 585/640 |
| 2004/0220047 A1 * | 11/2004 | Doyle et al. ..................... 502/71 |
| 2005/0032630 A1 * | 2/2005 | Balducci et al. ................ 502/71 |
| 2006/0030477 A1 | 2/2006 | Chaumonnot et al. |
| 2006/0204419 A1 * | 9/2006 | Thomas et al. ................ 423/210 |
| 2007/0286786 A1 * | 12/2007 | Ikoma et al. ................ 423/239.2 |

FOREIGN PATENT DOCUMENTS

EP  1 627 853 A1  2/2006

OTHER PUBLICATIONS

Takahashi et al, Synthesis of Monolithic Zeolites with Macropores, Journal of the Ceramic Soc:;iety of Japan 11415 J 421-424 (2006).*
International Search Report of PCT/FR2008/001215 (Jun. 10, 2009).
L. Huang et al., "Hierarchical Porous Structures by Using Zeolite Nanocrystals as Building Blocks", Microporous and Mesoporous Materials. vol. 48 (2001) pp. 73-78.
V. Naydenov et al., "Self-Bonded Zeolite Beta/MCM-41 Composite Spheres", Journal of Porous Materials, vol. 12 (2005) pp. 193-199.
J. C. Groen et al., "Mechanism of Hierarchical Porosity Development in MFI Zeolites by Desilication: The Role of Aluminium as a Pore-Directing Agent", Chem. Eur. J., vol. 11 (2005) pp. 4983-4994.
B. Zhang et al., "Starch Gel Templating of Spongelike Macroporous Silicalite Monoliths and Mesoporous Films", Chem. Mater., vol. 14 (2002) pp. 1369-1375.
V. P. Valtchev et al., "Equisetum Arvense Templating of Zeolite Beta Macrostructures with Hierarchical Porosity", Chem. Mater., vol. 16 (2004) pp. 1350-1355.
W. C. Li et al., "Hierarchically Structured Monolithic Silicalite-1 Consisting of Crystallized Nanoparticles and Its Performance in the Beckmann Rearrangement of Cyclohexanone Oxime", J. Am. Chem. Soc., vol. 127 (2005) pp. 12595-12600.
R. Takahashi at al., "Synthesis of Monolithic Zeolites with Macropores", Journal of the Ceramic Society of Japan, vol. 114, No. 5 (2006) pp. 421-424.

* cited by examiner

*Primary Examiner* — Bijay Saha
(74) *Attorney, Agent, or Firm* — Millen, White, Zelano & Branigan, P.C.

(57) ABSTRACT

Hierarchical porosity material consisting of at least two elementary spherical particles having a maximum diameter of 200 microns, at least one of said spherical particles comprises at least one matrix based on silicon oxide and exhibiting crystallized walls, said material having a macropore volume measured by mercury porosimetry ranging between 0.05 and 1 ml/g, a mesopore volume measured by nitrogen volumetric analysis ranging between 0.01 and 1 ml/g and a micropore volume measured by nitrogen volumetric analysis ranging between 0.03 and 0.4 ml/g. The preparation of said material and use of same as adsorbent or as acidic solid is also described.

19 Claims, No Drawings

CRYSTALLIZED MATERIAL WITH HIERARCHICAL POROSITY CONTAINING SILICON

FIELD OF THE INVENTION

The present invention relates to the field of materials containing silicon, notably metallosilicate materials and more precisely aluminosilicate materials, with hierarchical porosity within the microporosity, mesoporosity and macroporosity domain. It also relates to the preparation of these materials that are obtained by means of the synthesis technique referred to as aerosol synthesis.

BACKGROUND OF THE INVENTION

New synthesis strategies allowing to obtain materials of well-defined porosity in a very wide range, from microporous materials to macroporous materials to hierarchical porosity materials, i.e. having pores of several sizes, have known a very large development within the scientific community since the mid-90s (G. J. de A. A. Soler-Illia, C. Sanchez, B. Lebeau, J. Patarin, Chem. Rev., 2002, 102, 4093). In particular, considerable work has been done on the development of materials having a porosity of zeolitic nature and a mesoporosity so as to simultaneously benefit from the catalytic properties specific to zeolites and from the catalytic and especially the textural properties of the mesoporous phase.

A technique that is commonly used to generate materials having such biporosity consists in directly creating mesopores within zeolite crystals by subjecting the zeolite to a steam-hydrothermal treatment, also referred to as steaming. Under the effect of this treatment, the mobility of the tetrahedric atoms that make up the framework of the zeolite is increased to such an extent that some of these atoms are extracted from the network, which causes formation of amorphous zones that can be removed to give way to mesoporous cavities (A. H. Jansen, A. J. Koster, K. P. de Jong, J. Phys. Chem. B, 2002, 106, 11905). The formation of such cavities can also be obtained by subjecting the zeolite to an acid treatment (H. Ajot, J. F. Joly, J. Lynch, F. Raatz, P. Caullet, Stud. Surf. Sci. Catal., 1991, 62, 583). These methods however have the drawback of making part of the zeolite partly amorphous and of modifying the properties thereof through variation of the chemical composition. In any case, the mesoporosity thus introduced allows to eliminate or at least to limit diffusion limitation problems encountered in microporous materials, mesopores having much greater diffusion factors than micropores and thus allowing access to the active sites of the zeolites (P. B. Weisz, Chemtech, 1973, 3, 498).

More recently, much work has been done on the elaboration of mixed mesostructured/zeolite materials, mesostructured materials affording the additional advantage of a perfectly organized and calibrated porosity in the mesopore range.

It can be briefly reminded here that mesostructured materials are conventionally obtained via synthesis methods referred to as soft chemistry methods that consist in bringing together, in aqueous solution or in polar solvents, inorganic precursors with structuring agents, generally molecular or macromolecular surfactants, ionic or neutral. Control of electrostatic interactions or of interactions through hydrogen bonds between the inorganic precursors and the structuring agent jointly linked with hydrolysis/condensation reactions of the inorganic precursor leads to a cooperative assembly of the organic and inorganic phases generating micellar aggregates of surfactants of uniform size controlled within an inorganic matrix. Clearance of the porosity is then obtained by surfactant elimination, which is conventionally carried out by means of chemical extraction processes or by thermal treatment. Depending on the nature of the inorganic precursors and of the structuring agent used, and on the operating conditions applied, several families of mesostructured materials have been developed, such as the M41S family obtained using quaternary ammonium salts as the structuring agent (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, J. Am. Chem. Soc., 1992, 114, 27, 10834) or the SBA family obtained using three-block copolymers as the structuring agent (D. Zhao, J. Feng, Q. Huo, N. Melosh, G. H. Fredickson, B. F. Chmelka, G. D. Stucky, Science, 1998, 279, 548).

Several synthesis techniques allowing elaboration of such mixed mesostructured/zeolite materials have thus been listed in the open literature. A first synthesis technique consists in synthesizing in a first stage a mesostructured aluminosilicate material according to the conventional methods described above, then, in a second stage, in impregnating this material with a structuring agent commonly used in the synthesis of zeolitic materials. A suitable hydrothermal treatment leads to a zeolitization of the amorphous walls of the initial mesostructured aluminosilicate (K. R. Koletstra, H. van Bekkum, J. C. Jansen, Chem. Commun., 1997, 2281; D. T. On, S. Kaliaguine, Angew. Chem. Int. Ed., 2001, 40, 3248; D. T. On, D. Lutic, S. Kaliaguine, Micropor. Mesopor. Mater., 2001, 44, 435; M. J. Verhoef, P. J. Kooyman, J. C. van der Waal, M. S. Rigutto, J. A. Peters, H. van Bekkum, Chem. Mater., 2001, 13, 683). A second synthesis technique consists in bringing together a colloidal solution of zeolite seeds and a surfactant commonly used to create a mesostructuration of the final material. The basic idea here is to simultaneously generate the elaboration of an inorganic matrix of organized mesoporosity and the growth, within this matrix, of zeolite seeds so as to ideally obtain a mesostructured aluminosilicate material with crystallized walls (Z. T. Zhang, Y. Han, F. S. Xiao, S. L. Oiu, L. Zhu, R. W. Wang, Y. Yu, Z. Zhang, B. S. Zou, Y. Q. Wang, H. P. Sun, D. Y. Zhao, Y. Wei, J. Am. Chem. Soc., 2001, 123, 5014). A variant of these two techniques consists in starting from a mixture of aluminium and silicon precursors in the presence of two structuring agents, one likely to generate a zeolitic system and the other likely to generate a mesostructuration. This solution is then subjected to two crystallization stages under variable hydrothermal treatment conditions, the first stage leading to the formation of the mesoporous structure of organized porosity and the second stage leading to the zeolitization of the amorphous walls (A. Karlsson, M. Stocker, R. Schmidt, Micropor. Mesopor. Mater., 1999, 27, 181; A. Karlsson, M. Stocker, R. Schmidt, Stud. Surf. Sci. Catal., 2000, 129, 99). All of these synthesis methods have the drawback of damaging the mesostructure and thus to lose the advantages thereof in cases where growth of the zeolite seeds or zeolitization of the walls is not perfectly controlled, which makes these techniques delicate to implement.

It can be noted that it is also possible to directly elaborate composite mesostructured/zeolite materials so as to take advantage of the catalytic properties specific to each one of these phases. This can be done through thermal treatment of a mixture of a zeolite seed solution and of a mesostructured aluminosilicate seed solution (P. Prokesova, S. Mintova, J. Cejka, T. Bein, Micropor. Mesopor. Mater., 2003, 64, 165) or through growth of a zeolite layer at the surface of a presynthesized mesostructured aluminosilicate (D. T. On, S. Kaliaguine, Angew. Chem. Int. Ed., 2002, 41, 1036).

To the exclusion of the mesoporous zeolitic materials obtained through post-treatment of a zeolite, we note that, from an experimental point of view, all these materials are obtained by direct precipitation of inorganic precursors in the presence or not of structuring agents within an aqueous solution or in polar solvents, this stage being in most cases followed by one or more ripening stages in an autoclave. The elementary particles usually obtained exhibit no regular shape and they are generally characterized by a size ranging between 200 and 500 nm.

Work has also been done on the elaboration of materials exhibiting both microporosity and macroporosity. By way of example, one of the most commonly used synthesis methods consists in using polystyrene balls as the macroporosity-generating element and in creating around these balls a zeolitic network (G. S. Zhu, S. L. Qiu, F. F. Gao, D. S. Li, Y. F. Li, R. W. Wang, B. Gao, B. S. Li, Y. H. Guo, R. R. Xu, Z. Liu, O. Terasaki, *J. Mater. Chem.*, 2001, 11, 6, 1687).

SUMMARY OF THE INVENTION

The invention relates to a hierarchical porosity material consisting of at least two elementary spherical particles having a maximum diameter of 200 microns, at least one of said spherical particles comprises at least one matrix based on silicon oxide, said material having a macropore volume measured by mercury porosimetry ranging between 0.05 and 1 ml/g, a mesopore volume measured by nitrogen volumetric analysis ranging between 0.01 and 1 ml/g and a micropore volume measured by nitrogen volumetric analysis ranging between 0.03 and 0.4 ml/g, said matrix exhibiting crystallized walls consisting of zeolitic entities at the origin of the material microporosity. Said matrix based on silicon oxide optionally also comprises at least one element X selected from among aluminium, iron, boron, indium and gallium, preferably aluminium. The present invention also relates to the preparation of the material according to the invention. The method of preparing the material according to the invention comprises a) preparing a clear solution containing the zeolitic entity precursor elements, i.e. at least one structuring agent, at least one silicic precursor and possibly at least one precursor of at least one element X selected from among aluminium, iron, boron, indium and gallium; b) mixing into a solution at least one surfactant and at least said clear solution obtained in stage a); c) aerosol atomizing said solution obtained in stage b) so as to lead to the formation of spherical droplets; d) drying said droplets; e) autoclaving the particles obtained in stage d); f) drying said particles obtained in stage e); and g) eliminating said structuring agent and said surfactant so as to obtain a hierarchical porosity crystallized material in the microporosity, mesoporosity and macroporosity range.

The microporosity induced by the crystallized walls of zeolitic nature of the material according to the invention results not only from the use of a solution comprising the zeolitic entity precursor elements according to stage a) of the method of the invention, but also from autoclaving of the particles according to stage e) of the method of preparing the material according to the invention. The mesoporosity and the macroporosity of the material according to the invention are due to the phenomenon of phase separation through spinodal decomposition of the organic phase generated by the presence of the surfactant and of the inorganic phase from the solution containing the zeolitic entity precursor elements, this phase separation phenomenon being induced by the aerosol technique according to stage c) of the method of the invention.

The material according to the invention that comprises a mesoporous and macroporous inorganic matrix, based on silicon oxide, with microporous and crystallized walls, simultaneously exhibits the structural, textural and acidobasicity properties specific to the material of the zeolite family and the textural properties specific to mesoporous and macroporous materials. The presence, within the same spherical particle of micrometric or even nanometric size, of mesopores and macropores in a microporous and crystallized inorganic matrix leads to preferential access of the reactants and the reaction products to the microporous sites when the material according to the invention is used as adsorbent or as acidic solid in potential industrial applications. Furthermore, the material according to the invention consists of spherical elementary particles, the diameter of these particles being maximum 200 μm, preferably less than 100 μm, advantageously ranging between 50 nm and 20 μm, more advantageously between 50 nm and 10 μm and most advantageously between 50 nm and 300 nm. The limited size of these particles and their homogeneous spherical size provides better diffusion of the reactants and of the reaction products when the material according to the invention is used in potential industrial applications by comparison with materials known from the prior art that come in form of elementary particles of non-homogeneous shape, i.e. irregular, and of size often above 500 nm.

DETAILED DESCRIPTION

The object of the present invention is a hierarchical porosity material consisting of at least two elementary spherical particles having a maximum diameter of 200 microns, at least one of said spherical particles comprises at least one matrix based on silicon oxide and exhibiting crystallized walls, said material having a macropore volume measured by mercury porosimetry ranging between 0.05 and 1 ml/g, a mesopore volume measured by nitrogen volumetric analysis ranging between 0.01 and 1 ml/g and a micropore volume measured by nitrogen volumetric analysis ranging between 0.03 and 0.4 ml/g.

What is understood to be a hierarchical porosity material in the sense of the present invention is a material having at least one and generally more spherical particle(s) with triple porosity: a macroporosity characterized by a macroporous mercury volume ranging from 0.05 to 1 ml/g and preferably from 0.1 to 0.3 ml/g, a mesoporosity characterized by a mesopore volume measured by nitrogen volumetric analysis ranging from 0.01 to 1 ml/g and preferably ranging from 0.1 to 0.6 ml/g and a microporosity of zeolitic type whose characteristics (structural type of the zeolite, chemical composition of the zeolite framework) depend on the constituent zeolitic entities of the crystallized walls of each matrix of the spherical particles of the material according to the invention. The macroporosity is also characterized by the presence of macroporous domains ranging from 50 to 1000 nm, preferably from 80 to 500 nm, and/or it results from an intraparticular textural macroporosity. The mesoporosity is also characterized by the presence of mesoporous domains ranging from 2 to 50 nm, preferably from 10 to 50 nm. The material according to the invention can also advantageously have elementary spherical particles without mesoporosity. It can be noted that a porosity of microporous nature can also result from the imbrication of the surfactant used to prepare the material according to the invention with the inorganic wall at the level of the organic-inorganic interface developed upon elaboration of said material according to the invention.

In accordance with the invention, the matrix based on silicon oxide forming each of the spherical particles of the material according to the invention has crystallized walls consisting of zeolitic entities that are at the origin of the microporosity present within each spherical particle of the material according to the invention. Any zeolite and in particular, but in a non-exhaustive manner, those listed in "*Atlas of zeolite framework types*", 5th revised Edition, 2001, C. Baerlocher, W. M. Meier, D. H. Olson can be used to form the constituent zeolitic entities of the crystallized walls of the matrix of each particle of the material according to the invention from the moment that bringing into solution the precursor elements of these entities, i.e. at least one structuring agent, at least one silicic precursor and optionally at least one precursor of at least one element X selected from among aluminium, iron, boron, indium and gallium, preferably aluminium, allows to obtain a clear solution. The constituent zeolitic entities of the crystallized walls of the matrix of each particle of the material according to the invention and at the origin of the microporosity thereof preferably comprise at least one zeolite selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, mordenite, NU-87, NU-88, NU-86, NU-85, IM-5, IM-12, Ferrierite and EU-1. More preferably, the zeolitic entities that make up the crystallized walls of the matrix of each particle of the material according to the invention comprise at least one zeolite selected from among the structural type zeolites MFI, BEA, FAU and LTA.

In accordance with the invention, the matrix based on silicon oxide forming each of the elementary spherical particles of the material according to the invention is either entirely silicic or it comprises, in addition to silicon, at least one element X selected from among aluminium, iron, boron, indium and gallium, preferably aluminium. Thus, the zeolitic entities that make up the crystallized walls of the matrix of each particle of the material according to the invention and at the origin of the microporosity thereof advantageously comprise at least one zeolite either entirely silicic or comprising, in addition to silicon, at least one element X selected from among aluminium, iron, boron, indium and gallium, preferably aluminium. When X is aluminium, the matrix of the material is in this case an aluminosilicate. This aluminosilicate has a Si/Al molar ratio equal to that of the silicic and aluminic precursors leading to the formation of the constituent zeolitic entities of the crystallized walls of the matrix.

In accordance with the invention, said elementary spherical particles making up the material according to the invention have a maximum diameter of 200 microns, preferably less than 100 microns, advantageously ranging between 50 nm and 20 µm, more advantageously ranging between 50 nm and 10 µm, and most advantageously ranging between 50 and 300 nm. More precisely, they are present in the material according to the invention in form of aggregates.

The material according to the invention advantageously has a specific surface area ranging between 10 and 1100 m$^2$/g, more advantageously between 200 and 800 m$^2$/g.

The object of the present invention also is the preparation of the material according to the invention. Said method of preparing the material according to the invention comprises: a) preparing a clear solution containing the zeolitic entity precursor elements, i.e. at least one structuring agent, at least one silicic precursor and possibly at least one precursor of at least one element X selected from among aluminium, iron, boron, indium and gallium, preferably aluminium; b) mixing into a solution at least one surfactant and at least said clear solution obtained in stage a); c) aerosol atomizing said solution obtained in stage b) so as to lead to the formation of spherical droplets; d) drying said droplets; e) autoclaving the particles obtained in stage d); f) drying said particles obtained in stage e); and g) eliminating said structuring agent and said surfactant so as to obtain a hierarchical porosity crystallized material in the microporosity, mesoporosity and macroporosity range.

According to stage a) of the preparation method according to the invention, the clear solution containing the zeolitic entity precursor elements, i.e. at least one structuring agent, at least one silicic precursor and optionally at least one precursor of at least one element X selected from among aluminium, iron, boron, indium and gallium, preferably aluminium, is prepared from operating protocols known to the person skilled in the art.

The silicic precursor used for carrying out stage a) of the method according to the invention is selected from among the silicon oxide precursors known to the person skilled in the art. In particular, a silicic precursor selected from among the silica precursors commonly used in the synthesis of zeolites is advantageously used, for example powdered solid silica, silicic acid, colloidal silica, dissolved silica or tetraethoxysilane, also referred to as tetraethylorthosilicate (TEOS), is used. The silicic precursor preferably is TEOS.

The precursor of element X, optionally used for carrying out stage a) of the method according to the invention, can be any compound comprising element X and that can release this element in solution, notably in aqueous or aquo-organic solution, in reactive form. In the preferred case where X is aluminium, the aluminic precursor advantageously is an inorganic aluminium salt of formula $AlZ_3$, Z being a halogen, a nitrate or a hydroxide. Preferably, Z is chlorine. The aluminic precursor can also be an aluminium sulfate of formula $Al_2(SO_4)_3$. The aluminic precursor can also be an organometallic precursor of formula $Al(OR)_3$ where R=ethyl, isopropyl, n-butyl, s-butyl ($Al(O^sC_4H_9)_3$) or t-butyl or a chelated precursor such as aluminium acetylacetonate ($Al(C_5H_8O_2)_3$). Preferably, R is s-butyl. The aluminic precursor can also be sodium aluminate or alumina proper, in one of its crystalline phases known to the person skilled in the art (alpha, delta, teta, gamma), preferably in hydrated form or a form that can be hydrated.

It is also possible to use mixtures of the aforementioned precursors. Some or all of the aluminic and silicic precursors can optionally be added in form of a single compound comprising both aluminium atoms and silicon atoms, an amorphous silica alumina for example.

The structuring agent used for carrying out stage a) of the method according to the invention can be ionic or neutral depending on the zeolite to be synthesized. The structuring agents from the following non-exhaustive list are frequently used: nitrogen-containing organic cations such as tetrapropylammonium (TPA), elements from the alkaline family (Cs, K, Na, etc.), crown ethers, diamines, as well as any other structuring agent known to the person skilled in the art for zeolite synthesis.

The clear solution containing the zeolitic entity precursor elements is generally obtained according to stage a) of the material preparation method according to the invention by preparing a reaction mixture containing at least one silicic precursor, optionally at least one precursor of at least one element X selected from among aluminium, iron, boron, indium and gallium, preferably at least one aluminic precursor, and at least one structuring agent. The reaction mixture is either aqueous or aquo-organic, a water-alcohol mixture for example. A basic reaction medium is preferably used in the various stages of the method according to the invention in order to favour the development of the zeolitic entities that make up the crystallized walls of the matrix of each particle of the material according to the invention. The basicity of the solution is advantageously provided by the basicity of the structuring agent used or by basification of the reaction mixture through addition of a basic compound, for example an alkaline metal hydroxide, preferably sodium hydroxide. The reaction mixture can be subjected to hydrothermal conditions under autogenous pressure, optionally by adding a gas, nitrogen for example, at a temperature ranging between ambient temperature and 200° C., preferably between ambient temperature and 170° C., more preferably at a temperature that does not exceed 120° C. until formation of a clear solution containing the precursor elements of the zeolitic entities that make up the crystallized walls of the matrix of each spherical particle of the material according to the invention. According to a preferred method of operation, the reaction mixture containing at least one structuring agent, at least one silicic precursor and optionally at least one precursor of at least one element X selected from among aluminium, iron, boron, indium and gallium is ripened at ambient temperature so as to obtain a clear solution containing the precursor elements of zeolite seeds likely to generate the formation of crystallized zeolitic entities during autoclaving stage e) of the material preparation method according to the invention.

In accordance with stage a) of the method of the invention, the precursor elements of the zeolitic entities present in the clear solution are synthesized according to operating protocols known to the person skilled in the art. In particular, for a material according to the invention the matrix of each particle of which consists of beta zeolite entities, a clear solution containing precursor elements of beta zeolite entities is prepared from the operating protocol described by P. Prokesova, S. Mintova, J. Cejka, T. Bein et al., *Micropor. Mesopor. Mater.*, 2003, 64, 165. For a material according to the invention the matrix of each particle of which consists of Y zeolite entities, a clear solution containing precursor elements of Y zeolites entities is prepared from the operating protocol described by Y. Liu, W. Z. Zhang, T. J. Pinnavaia et coll., *J. Am. Chem. Soc.*, 2000, 122, 8791. For a material according to the invention the matrix of each particle of which consists of faujasite zeolite entities, a clear solution containing precursor elements of faujasite zeolite entities is prepared according to the operating protocol described by K. R. Kloetstra, H. W. Zandbergen, J. C. Jansen, H. vanBekkum, *Microporous Mater.*, 1996, 6, 287. For a material according to the invention the matrix of each particle of which consists of ZSM-5 zeolite entities, a clear solution containing precursor elements of ZSM-5 zeolite entities is prepared according to the operating protocol described by A. E. Persson, B. J. Schoeman, J. Sterte, J.-E. Otterstedt, *Zeolites*, 1995, 15, 611, the exact operating protocol being the object of Example 1 of the present application. In the particular case of a purely silicic material, the clear solution containing the precursor elements of silicalite zeolite entities making up the walls of the material according to the invention is advantageously prepared from the operating protocol described by A. E. Persson, B. J. Schoeman, J. Sterte, J.-E. Otterstedt, *Zeolites*, 1994, 14, 557.

In accordance with stage b) of the material preparation method according to the invention, the surfactant used is an ionic or non-ionic surfactant or a mixture thereof. Preferably, the ionic surfactant is selected from among anionic surfactants such as sulfates, like for example sodium dodecylsulfate (SDS). Preferably, the non-ionic surfactant can be any copolymer having at least two parts of different polarities conferring amphiphilic macromolecule properties on them. These copolymers can belong to the non-exhaustive list of the following copolymer families: fluorinated copolymers (—[CH$_2$—CH$_2$—CH$_2$—CH$_2$—O—CO—R1- with R1=C$_4$F$_9$, C$_8$F$_{17}$, etc.), biological copolymers such as polyamino acids (poly-lysine, alginates, etc.), dendrimers, block copolymers consisting of poly(alkylene oxide) chains and any other copolymer of amphiphilic character known to the person skilled in the art (S. Förster, M. Antionnetti, *Adv. Mater*, 1998, 10, 195-217; S. Förster, T. Plantenberg, *Angew. Chem. Int. Ed*, 2002, 41, 688-714; H. Cölfen, *Macromol. Rapid Commun*, 2001, 22, 219-252).

Preferably, a block copolymer consisting of poly(alkylene oxide) chains is used within the scope of the present invention. Said block copolymer is preferably a block copolymer having two, three or four blocks, each block consisting of a poly(alkylene oxide) chain. For a two-block copolymer, one of the block consists of a poly(alkylene oxide) chain of hydrophilic nature and the other block consists of a poly(alkylene oxide) chain of hydrophobic nature. For a three-block copolymer, two of the blocks consist of a poly(alkylene oxide) chain of hydrophilic nature whereas the other block, located between the two blocks with hydrophilic parts, consists of a poly(alkylene oxide) chain of hydrophobic nature. Preferably, in the case of a three-block copolymer, the poly(alkylene oxide) chains of hydrophilic nature are poly(ethylene oxide) chains denoted by (PEO)$_X$ and (PEO)$_Z$, and the poly(alkylene oxide) chains of hydrophobic nature are poly(propylene oxide) chains denoted by (PPO)$_Y$, poly(butylene oxide) chains or mixed chains each chain of which is a mixture of several alkylene oxide monomers. More preferably, in the case of a three-block copolymer, a compound consisting of two poly(ethylene oxide) chains and of a poly(propylene oxide) chain is used; more particularly, it is the compound of formula (PEO)$_X$-(PPO)$_Y$-(PEO)$_Z$ where x ranges between 5 and 300, y ranges between 33 and 300, and z ranges between 5 and 300. Preferably, the values of x and z are identical. A compound wherein x=20, y=70 and z=20 (P123) and a compound wherein x=106, y=70 and z=106 (F127) are very advantageously used. The commercial non-ionic surfactants known as Pluronic (BASF), Tetronic (BASF), Triton (Sigma), Tergitol (Union Carbide) and Brij (Aldrich) can be used as non-ionic surfactants in stage b) of the preparation method according to the invention. For a four-block copolymer, two of the blocks consist of a poly(alkylene oxide) chain of hydrophilic nature and the other two blocks consist of a poly(alkylene oxide) chain of hydrophobic nature.

The solution obtained at the end of stage b) of the material preparation method according to the invention wherein at least said surfactant and at least said clear solution obtained in stage a) are mixed can be acid, neutral or basic. Preferably, said solution is basic and it preferably has a pH value above 9, this pH value being generally imposed by the pH value of the clear solution containing the precursor elements of zeolitic entities obtained according to stage a) of the material preparation method according to the invention. The solution obtained at the end of stage b) can be aqueous or it can be a mixture of water and organic solvent, the organic solvent preferably being a polar solvent, notably an alcohol, preferably ethanol.

The amount of surfactant introduced in the mixture in accordance with stage b) of the preparation method according to the invention is defined in relation to the amount of inorganic matter introduced in said mixture when adding the clear solution containing the precursor elements of zeolitic entities obtained according to stage a) of the method according to the invention. The amount of inorganic matter corresponds to the amount of silicic precursor and to the amount of precursor of element X when it is present. The $n_{inorganic}/n_{surfactant}$ molar ratio is such that the organic-inorganic binary system formed during atomization stage c) of the material preparation method according to the invention undergoes a phase separation characterized by the appearance of an interconnected two-phase network whose formation mechanism is a spinodal decomposition. The composition domain for which a phase separation occurs by a spinodal decomposition mechanism is delimited by bounds for which the free enthalpy G of the binary system is minimized ($\partial G/\partial x=0$, x being the molar fraction of the organic phase, 1−x that of the inorganic phase) and, for each composition belonging to this domain, the second derivative of the enthalpy $\partial^2 G/\partial^2 x$ is greater than 0. The principle of phase separation via a spinodal decomposition mechanism has been widely described by Nakanishi for obtaining silica gels in the presence of polymers (K. Nakanishi, *Journal of Porous Materials*, 1997, 4, 67). The particular interconnection of the two-phase organic-inorganic network resulting from this phase separation phenomenon through spinodal decomposition is at the origin of the particular mesoporous and macroporous texture exhibited by the material according to the invention. In accordance with stage b) of the method according to the invention, the initial concentration of the surfactant introduced in the mixture, defined by $c_0$, is such that $c_0$ is less than or equal to $c_{mc}$, parameter $c_{mc}$ representing the critical micellar concentration known to the person skilled in the art, i.e. the limit concentration beyond which the phenomenon of self-assembly of the surfactant molecules occurs. Prior to atomization, the surfactant molecule concentration of the solution defined by stage b) of the material preparation method according to the invention does therefore not lead to the formation of particular micellar phases. In a preferred embodiment of the method according to the invention, concentration $c_0$ is less than $c_{mc}$, the $n_{inorganic}/n_{surfactant}$ molar ratio is such that the composition of the binary system verifies the composition conditions for which a phase separation mechanism takes place through spinodal decomposition and said solution sought in stage b) of the preparation method according to the invention is a basic water-alcohol mixture.

The mixture atomization stage according to stage c) of the preparation method according to the invention produces spherical droplets. The size distribution of these droplets is of lognormal type. The aerosol generator used here is a commercial device of 9306 A type provided by TSI having a 6-jet atomizer. Atomization of the solution occurs in a chamber into which a carrier gas, a $O_2/N_2$ mixture (dry air), is sent at a pressure P of 1.5 bar.

In accordance with stage d) of the preparation method according to the invention, said droplets are dried. Drying is carried out through the transportation of said droplets via the carrier gas, the $O_2/N_2$ mixture, in PVC tubes, which leads to the progressive evaporation of the solution, for example the basic aquo-organic solution obtained during stage b) of the material preparation method according to the invention, and thus to the formation of spherical elementary particles. This drying procedure is completed by the passage of said particles through an oven whose temperature can be adjusted, the usual temperature ranging between 50° C. and 600° C., preferably between 80° C. and 400° C., the residence time of the particles in the oven being of the order of one second. The particles are then recovered in a filter. A pump arranged at the end of the circuit favours the delivery of the species in the aerosol experimental device. Drying of the droplets according to stage d) of the method of the invention is advantageously followed by passage through a stove at a temperature ranging between 50° C. and 150° C.

In accordance with stage e) of the method according to the invention, the dried particles obtained in stage d) of the method according to the invention are autoclaved in the presence of a solvent. This stage consists in placing said particles in an enclosure in the presence of a solvent at a given temperature so as to operate under autogenous pressure inherent in the operating conditions selected. The solvent used is a protic polar solvent. Preferably, the solvent used is water. The volume of solvent introduced is defined in relation to the volume of the autoclave selected. Thus, the volume of solvent introduced ranges between 0.01 and 20% of the volume of the autoclave selected, preferably between 0.05 and 5%, and more preferably between 0.05 and 1%. The autoclaving temperature ranges between 50° C. and 200° C., preferably between 60° C. and 170° C., and more preferably between 60° C. and 120° C. so as to allow growth of zeolitic entities in the walls of the matrix of each particle of the material according to the invention without generating too large zeolite crystals that would disorganize the mesoporosity and the macroporosity created within each particle of the material according to the invention. Autoclaving is continued for 1 to 96 hours, preferably for 20 to 50 hours.

In accordance with stage f) of the preparation method according to the invention, drying of the particles after autoclaving is advantageously carried out in a stove at a temperature ranging between 50° C. and 150° C.

In the particular case where element X optionally used in stage a) of the method according to the invention is the element aluminium and where the element sodium is present in the clear solution obtained in accordance with stage a) of the method according to the invention via the use of sodium hydroxide and/or of a sodium-containing structuring agent providing the basicity of said clear solution, an additional stage of ionic exchange allowing the $Na^+$ cation to be exchanged for the $NH_4^+$ cation between stages f) and g) of the method according to the invention is preferably carried out. This exchange, which leads to the formation of $H^+$ protons after stage g) of the method according to the invention in the preferred case where elimination of the structuring agent and of the surfactant is performed by calcination in air, is carried out according to operating protocols known to the person skilled in the art. One of the usual methods consists in suspending the dried solid particles from stage f) of the method according to the invention in an aqueous solution of ammonium nitrate. The assembly is then brought to reflux for 1 to 6 hours. The particles are then recovered by filtering (9000 rpm centrifugation), washed and then dried through passage in the stove at a temperature ranging between 50° C. and 150° C. This ion exchange/washing/drying cycle can be repeated several times and preferably two more times. This exchange cycle can also be performed after stages f) and g) of the method according to the invention. Under these conditions, stage g) is then repeated after the last exchange cycle so as to generate the $H^+$ protons as explained above.

In accordance with stage g) of the preparation method according to the invention, elimination of the structuring agent and of the surfactant in order to obtain the material according to the invention with a hierarchical porosity is advantageously carried out by means of chemical extraction methods or thermal treatment, preferably by calcination in air in a temperature range between 300° C. and 1000° C., preferably between 400° C. and 600° C., for 1 to 24 hours, preferably for 2 to 12 hours.

If the solution prepared in stage b) of the preparation method according to the invention is a water-organic solvent mixture, preferably basic, it is essential that, during stage b) of the preparation method according to the invention, the surfactant concentration be lower than the critical micellar concentration and that the $n_{inorganic}/n_{surfactant}$ ratio be such that the variation of the free enthalpy of mixing $\Delta G_m$ and the second derivative of the free enthalpy $\partial^2G/\partial^2x$ be greater than 0, so that the evaporation of said aquo-organic solution, preferably basic, during stage c) of the preparation method according to the invention by means of the aerosol technique induces a phenomenon of organic and inorganic phase separation through spinodal decomposition leading to the generation of the mesoporous and macroporous phases of the spherical particles of the material according to the invention. Said observed phase separation is the result of a progressive concentration, within each droplet, of the silicic precursor, optionally of the precursor of element X, preferably of the aluminic precursor and of the surfactant resulting from an evaporation of the aquo-organic solution, preferably basic, until a sufficient reactant concentration is reached to cause said phenomenon.

The hierarchical porosity material according to the present invention can be obtained in form of powder, balls, pellets, granules or extrudates, the shaping operations being performed using conventional techniques known to the person skilled in the art. Preferably, the hierarchical porosity material according to the invention is obtained in form of a powder consisting of elementary spherical particles having a maximum diameter of 200 µm, which facilitates a possible reactant diffusion if the material according to the invention is used in a potential industrial application.

The hierarchical porosity material according to the invention is characterized by means of several analysis techniques, notably wide-angle X-ray diffraction (WAXD), nitrogen volumetric analysis (BET), mercury porosimetry, transmission electron microscopy (TEM), scanning electron microscopy (SEM) and X-ray fluorescence (XRF).

The wide-angle X-ray diffraction technique (values of angle $2\theta$ ranging between 5° and) 70° allows to characterize a crystallized solid defined by the repetition of a unit pattern or elementary cell on the molecular scale. In the description hereafter, analysis of the X rays is carried out on powder with a reflection diffractometer equipped with a rear monochromator, using copper radiation (wavelength 1.5406 Å). The peaks usually observed in diffractograms corresponding to a given value of angle $2\theta$ are associated with the inter-reticular distances $d_{(hkl)}$ characteristic of the structural symmetry (symmetries) of the material, ((hkl) being the Miller indices of the reciprocal network) by the Bragg relation: $2d_{(hkl)}*\sin(\theta)=n*\lambda$. This indexing then allows to determine the cell parameters (abc) of the direct network. Wide-angle X-ray diffraction analysis is thus well suited for structural characterization of the zeolitic entities that make up the crystallized wall of the matrix of each elementary spherical particle that the material according to the invention consists of. In particular, it allows to know the size of pores of the zeolitic entities. For example, the wide-angle X-ray diffractogram of a material of mesoporous and macroporous porosity, whose microporous matrix walls of each spherical particle consist of ZSM-5 (MFI) zeolite entities, obtained according to the method of the invention using TEOS as the silicic precursor, $Al(O^sC_4H_9)_3$ as the aluminic precursor, TPAOH as the structuring agent and the particular block copolymer known as poly(ethylene oxide)$_{106}$-poly(propylene oxide)$_{70}$-poly(ethylene oxide)$_{106}$ (PEO$_{106}$-PPO$_{70}$-PEO$_{106}$ or F127) as the surfactant exhibits the wide-angle diffractogram associated with the Pnma symmetry group (No. 62) of the ZSM-5 zeolite. The value of the angle obtained in the X-ray diffractogram allows to go back to the correlation distance d according to the Bragg law: $2d*\sin(\theta)=n*\lambda$. The values of the cell parameters a, b, c (a=20.1 Å, b=19.7 Å and c=13.1 Å) obtained for the zeolitic entity characterization are coherent with the values obtained for a ZSM-5 (MFI structural type) zeolite known to the person skilled in the art ("Collection of simulated XRD powder patterns for zeolites", $4^{th}$ revised Edition, 2001, M. M. J. Treacy, J. B. Higgins).

Nitrogen volumetric analysis, which corresponds to the physical adsorption of nitrogen molecules in the porosity of the material via a progressive pressure increase at constant temperature, provides information on the particular textural characteristics (pore diameter, porosity type, specific surface area) of the material obtained according to the method of the invention. In particular, it allows to know the total value of the micropore and mesopore volume of the material. The shape of the nitrogen adsorption isotherm and of the hysteresis loop can give information about the presence of the microporosity linked with the zeolitic entities making up the crystallized walls of the matrix of each spherical particle of the material according to the invention and about the nature of the mesoporosity. Quantitative analysis of the microporosity of the material according to the invention is carried out from the "t" (Lippens-De Boer method, 1965) or the "$\alpha_s$" (method provided by Sing) methods that correspond to transforms of the initial adsorption isotherm as described in "*Adsorption by powders and porous solids. Principles, methodology and applications*" written by F. Rouquerol, J. Rouquerol and K. Sing, Academic Press, 1999. These methods allow in particular to obtain the value of the micropore volume characteristic of the microporosity of the material according to the invention, as well as the specific surface area of the sample. The reference solid used is a LiChrospher Si-1000 silica (M. Jaroniec, M. Kruck, J. P. Olivier, *Langmuir*, 1999, 15, 5410). By way of example, the nitrogen adsorption isotherm of a material of mesoporous and macroporous porosity whose microporous matrix walls of each spherical particle consist of ZSM-5 (MFI) zeolite entities, obtained according to the material preparation method of the invention using TEOS as the silicic precursor, $Al(O^sC_4H_9)_3$ as the aluminic precursor, TPAOH as the structuring agent and the particular block copolymer known as polyethylene oxide)$_{106}$-(propylene oxide)$_{70}$-poly(ethylene oxide)$_{106}$(PEO$_{106}$-PPO$_{70}$-PEO$_{106}$ or F127) as the surfactant exhibits a great adsorption jump in the P/P0 low values range (where P0 is the saturated vapour pressure at temperature T), followed by a plateau with a very slight slope over a wide pressure range, characteristic of a microporous material, as well as a type IV isotherm and a type H1 hysteresis loop in the range of the high P/P0 values representative of mesopores whose size ranges between 1.5 and 50 nm. Similarly, curve $V_{ads}$ (ml/g)=$f(\alpha_s)$ obtained via the aforementioned $\alpha_s$ method is characteristic of the presence of microporosity within the material and it leads to a micropore volume value ranging between 0.03 and 0.4 ml/g. Determination of the total micropore and mesopore volume and of the micropore volume as described above leads to a mesopore volume value for the material according to the invention ranging between 0.01 and 1 ml/g.

Mercury porosimetry analysis corresponds to the intrusion of a volume of mercury characteristic of the existence of mesopores and of macropores in the material of the invention according to the ASTM D4284-83 standard at a maximum pressure of 4000 bars, using a surface tension of 484 dyne/cm and a contact angle of 140° (value selected following those recommended in "Technique de l'ingénieur, traité analyse et caractérisation", page 1050, written by J. Charpin and B. Rasneur), assuming that the pores are of cylindrical shape. This technique is perfectly well suited for analysis of mesoporous and macroporous samples as a complement to the nitrogen volumetric analysis technique described above. In particular, this technique allows to obtain the mesoporous mercury volume value ($V_{Hgmeso}$ in ml/g) defined as the mercury volume adsorbed by all of the pores whose diameter is in the mesopore range, i.e. ranging between 3.6 and 50 nm (value of the upper bound as defined according to the IUPAC standard). Similarly, the macroporous mercury volume ($V_{Hgmacro}$ in ml/g) is defined as the mercury volume adsorbed by all of the pores whose diameter is above 50 nm. By way of example, the mercury porosimetry analysis of a material of mesoporous and macroporous porosity, whose microporous matrix walls of each spherical particle consist of ZSM-5 (MFI) zeolite entities, obtained according to the method of the invention using TEOS as the silicic precursor, $Al(O^sC_4H_9)_3$ as the aluminic precursor, TPAOH as the structuring agent and the particular block copolymer known as poly(ethylene oxide)$_{106}$-poly(propylene oxide)$_{70}$-poly(ethylene oxide)$_{106}$ ($PEO_{106}$-$PPO_{70}$-$PEO_{106}$ or F127) as the surfactant leads to a mesoporous mercury volume ranging between 0.01 and 1 ml/g and to a macroporous mercury volume ranging between 0.05 and 1 ml/g.

Transmission electron microscopy (TEM) analysis is also a commonly used technique for characterizing the mesoporosity and the macroporosity of the material according to the invention. It allows formation of an image of the solid studied, the contrasts observed being characteristic of the structural organization, the texture, the morphology or the chemical composition of the particles observed, and the resolution of the technique can reach 0.2 nm maximum. In the description hereafter, the TEM photos are obtained from michrotome sections of the sample in order to visualize a section of an elementary spherical particle of the material according to the invention. For example, the TEM images obtained for a material of mesoporous and macroporous porosity the microporous matrix walls of each spherical particle of which consist of ZSM-5 (MFI) zeolite entities obtained according to the method of the invention using TEOS as the silicic precursor, $Al(O^sC_4H_9)_3$ as the aluminic precursor, TPAOH as the structuring agent and the particular block copolymer known as poly(ethylene oxide)$_{106}$-poly(propylene oxide)$_{70}$-poly (ethylene oxide)$_{106}$ ($PEO_{106}$-$PPO_{70}$-$PEO_{106}$ or F127) as the surfactant exhibit, within the same spherical particle, a mesoporosity and a macroporosity characteristic of an organic-inorganic phase separation through a spinodal decomposition mechanism after atomization stage c) of the material preparation method according to the invention whose domain size ranges between 15 and 50 nm and between 100 and 500 nm respectively. Analysis of the image also allows to visualize the presence of zeolitic entities that make up the walls of the material according to the invention.

The morphology and the size distribution of the elementary particles were established by analysis of photos obtained by scanning electron microscopy (SEM).

The present invention also relates to the use of the hierarchical porosity material according to the invention as the adsorbent for pollution control or as molecular sieve for separation. The object of the present invention thus also is an adsorbent comprising the hierarchical porosity material according to the invention. It is also advantageously used as an acidic solid for catalyzing reactions, for example those conducted in the spheres of refining and petrochemistry.

When the hierarchical porosity material according to the invention is used as a catalyst, this material can be associated with an inorganic matrix that can be inert or catalytically active and with a metallic phase. The inorganic matrix can be present simply as a binder to hold together the particles of said material in the various known catalyst forms (extrudates, pellets, balls, powders), or it can be added as a diluent to impose a degree of conversion in a process that would otherwise progress too rapidly, thus leading to catalyst fouling as a result of the formation of a large amount of coke. Typical inorganic matrices are notably supporting materials for catalysts, such as the various forms of silica, alumina, silica-alumina, magnesia, zirconia, as well as titanium, boron oxides, aluminium, titanium, zirconium phosphates, clays such as kaolin, bentonite, montmorillonite, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds. The inorganic matrix can be a mixture of various compounds, in particular of an inert phase and of an active phase. Said material of the present invention can also be associated with at least one zeolite and act as the main active phase or as an additive. The metallic phase can be introduced entirely on said material of the invention. It can also be introduced entirely on the inorganic matrix or on the assembly consisting of the inorganic matrix and the hierarchical porosity material by ion exchange or impregnation with cations or oxides selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element of the periodic table of elements.

The catalytic compositions comprising the material of the present invention are generally well suited for implementation of the main hydrocarbon conversion processes and organic compound synthesis reactions.

The catalytic compositions comprising the material of the invention advantageously find applications in the following reactions: isomerization, transalkylation and dismutation, alkylation and dealkylation, hydration and dehydration, oligomerization and polymerization, cyclization, aromatization, cracking, reforming, hydrogenation and dehydrogenation, oxidation, halogenation, hydrocracking, hydroconversion, hydrotreatment, hydrodesulfurization and hydrodenitrogenation, catalytic elimination of nitrogen oxides, said reactions involving feeds comprising saturated and unsaturated aliphatic hydrocarbons, aromatic hydrocarbons, oxygen-containing organic compounds and organic compounds containing nitrogen and/or sulfur, as well as organic compounds containing other functional groups.

The invention is illustrated by the following examples.

EXAMPLES

In the examples hereafter, the aerosol technique used is the technique described above in the description of the invention.

For each one of the examples below, the $V_{inorganic}/V_{organic}$ ratio of the mixture from stage b) is calculated. This ratio is defined as follows: $V_{inorganic}/V_{organic}=(m_{inorg}*\rho_{org})/(m_{org}*\rho_{inorg})$ with $m_{inorg}$ the final mass of the inorganic fraction in form of condensed oxide(s), i.e. $SiO_2$ and $AlO_2$, in the solid elementary particle, $m_{org}$ the total mass of the non-volatile organic fraction found in the solid elementary particle, i.e. the surfactant and the structuring agent, $\rho_{org}$ and $\rho_{inorg}$ the densities respectively associated with the non-volatile organic and inorganic fractions. In the following examples, we consider that $\rho_{org}=1$ and $\rho_{inorg}=2$. Thus, the $V_{inorganic}/V_{organic}$ ratio is calculated as equal to $V_{inorganic}/V_{organic}=(m_{SiO2}+m_{AlO2})/[2*(m_{structuring\ agent}+m_{surfactant})]$. Ethanol, soda and water are not taken into account in the calculation of said $V_{inorganic}/V_{organic}$ ratio.

Example 1 (Invention)

Preparation of a Material Having a Si/Al Molar Ratio=50, of Mesoporous and Macroporous Porosity, Whose Microporous Walls Consist of Crystallized Entities of ZSM-5 (MFI) Zeolite 10.05 g of a tetrapropylammonium hydroxide solution (TPAOH 20% by mass in an aqueous solution) are added to 4.3 g of demineralized water and 9.2 mg of sodium hydroxide NaOH. The mixture is left under stirring for 10 minutes. 0.14 g of aluminium sec-butoxide (Al(O$^s$C$_4$H$_9$)$_3$) is then added. Hydrolysis of the aluminic precursor is carried out for 1 hour. 6 g of tetraethylorthosilicate (TEOS) are then added. The mixture is kept under stirring for 18 hours at ambient temperature so as to obtain a clear solution. 18 ml of this solution are then added to a solution containing 35.2 g ethanol, 11.3 g water and 2 g surfactant F127 (pH value of the mixture=10.5). The $V_{inorganic}/V_{organic}$ ratio of the mixture is 0.20 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an O$_2$/N$_2$ mixture in PVC tubes. They are then fed into an oven set at a temperature of 250° C. in order to complete drying for a duration of the order of one second. The powder collected is then dried for 12 hours in a stove at 95° C. 10 mg of powder are then placed in a 100-ml autoclave (enclosure likely to withstand temperatures of the order of 200° C. and pressures of the order of 5 bars) in the presence of 100 µl demineralized water. The autoclave is provided with a "basket" or "cell" system allowing the powder not to be in direct contact with the water introduced while soaking in steam. The autoclave is then brought to a temperature of 95° C. for 48 hours. The powder collected is then dried in the stove at 95° C. for 12 hours. The powder is thereafter calcined in air for 5 hours at T=550° C. The solid is characterized by XRD, nitrogen volumetric analysis, mercury porosimetry, TEM, SEM, XF. The TEM analysis shows that the spherical particles that make up the material exhibit a core macroporosity characterized by 300 to 500-nm long and 100 to 200-nm wide domains, and a mesoporosity on the periphery of the particles characterized by 20 to 50-nm domains, the whole being characteristic of an organic-inorganic phase separation obtained by a spinodal decomposition mechanism present before the calcination stage. The presence of zeolitic entities in the walls of the material can also be clearly seen in the electron diffraction study of the michrotome sections of thickness of the order of 70 nm in localized zones of the order of 100 nm. Nitrogen volumetric analysis combined with the $\alpha_s$ method analysis leads to a value of the micropore volume $V_{micro}$ of 0.26 ml/g (N$_2$), a value of the mesopore volume $V_{meso}$ of 0.6 ml/g (N$_2$) and a specific surface area of the final material S=690 m$^2$/g. The macroporous mercury volume defined by mercury porosimetry is 0.5 ml/g (the value of the mesoporous mercury volume also obtained by mercury porosimetry is in total accordance with the value obtained by nitrogen volumetric analysis). The wide-angle X-ray diffraction analysis leads to the diffractogram characteristic of the ZSM-5 zeolite (micropore size, measured by XRD, of the order of 0.55 nm). The Si/Al molar ratio obtained by XF is 50. A SEM image of the spherical elementary particles thus obtained shows that these particles have a size characterized by a diameter ranging between 50 and 700 nm, the size distribution of these particles being around 300 nm.

Example 2 (Invention)

Preparation of a Material of Mesoporous and Macroporous Porosity, Whose Microporous Walls Consist of Crystallized Entities of Silicalite (MFI) Zeolite 10.05 g of a tetrapropylammonium hydroxide solution (TPAOH 20% by mass in an aqueous solution) are added to 4.3 g of demineralized water and 9.2 mg of sodium hydroxide NaOH. The mixture is left under stirring for 10 minutes. 6 g of tetraethylorthosilicate (TEOS) are then added. The mixture is kept under stirring for 18 hours at ambient temperature so as to obtain a clear solution. 18 ml of this solution are then added to a solution containing 35.2 g ethanol, 11.3 g water and 2 g surfactant F127 (pH value of the mixture=10.5). The $V_{inorganic}/V_{organic}$ ratio of the mixture is 0.20 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an O$_2$/N$_2$ mixture in PVC tubes. They are then fed into an oven set at a drying temperature of 250° C. The powder collected is then dried for 12 hours in a stove at 95° C. 10 mg of powder are then placed in a 100-ml autoclave (enclosure likely to withstand temperatures of the order of 200° C. and pressures of the order of 5 bars) in the presence of 100 µl demineralized water. The autoclave is provided with a "basket" or "cell" system allowing the powder not to be in direct contact with the water introduced while soaking in steam. The autoclave is then brought to a temperature of 95° C. for 36 hours. The powder collected is dried in the stove at 95° C. for 12 hours. The powder is then calcined in air for 5 hours at T=550° C. The solid is characterized by XRD, nitrogen volumetric analysis, mercury porosimetry, TEM, SEM. The TEM analysis shows that the spherical particles that make up the material exhibit a core macroporosity characterized by 300 to 500-nm long and 100 to 200-nm wide domains, and a mesoporosity on the periphery of the particles characterized by 20 to 50-nm domains, the whole being characteristic of an organic-inorganic phase separation obtained by a spinodal decomposition mechanism present before the calcination stage. The presence of zeolitic entities in the walls of the material can also be clearly seen in the electron diffraction study of the michrotome sections of thickness of the order of 70 nm in localized zones of the order of 100 nm. Nitrogen volumetric analysis combined with the $\alpha_s$ method analysis leads to a value of the micropore volume $V_{micro}$ of 0.3 ml/g (N$_2$), a value of the mesopore volume $V_{meso}$ of 0.6 ml/g (N$_2$) and a specific surface area of the final material S=680 m$^2$/g. The macroporous mercury volume defined by mercury porosimetry is 0.5 ml/g (the value of the mesoporous mercury volume also obtained by mercury porosimetry is in total accordance with the value obtained by nitrogen volumetric analysis). The wide-angle X-ray diffraction analysis leads to the diffractogram characteristic of the silicalite zeolite (micropore size, measured by XRD, of the order of 0.55 nm). A SEM image of the spherical elementary particles thus obtained shows that these particles have a size characterized by a diameter ranging between 50 and 700 nm, the size distribution of these particles being around 300 nm.

Example 3 (Invention)

Preparation of a Material of Mesoporous and Macroporous Porosity, Whose Microporous Walls Consist of Crystallized Entities of Beta (BEA) Zeolite and Having a Si/Al Molar Ratio=50

11.70 g of a tetraethylammonium hydroxide solution (TEAOH 20% by mass in an aqueous solution) are added to 7.8 g of demineralized water and 0.03 mg of sodium hydroxide NaOH. The mixture is left under stirring for 10 minutes.

0.14 g of aluminium sec-butoxide (Al(O$^s$C$_4$H$_9$)$_3$) is then introduced. The mixture is left under stirring for 10 minutes. Hydrolysis of the aluminic precursor is carried out for 1 hour. 6 g of tetraethylorthosilicate (TEOS) are then added. The mixture is kept under stirring for 18 hours at ambient temperature so as to obtain a clear solution. 18 ml of this solution are then added to a solution containing 35.2 g ethanol, 11.3 g water and 2 g surfactant F127 (pH value of the mixture=10). The V$_{inorganic}$/V$_{organic}$ ratio of the mixture is 0.17 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an O$_2$/N$_2$ mixture in PVC tubes. They are then fed into an oven set at a drying temperature of 250° C. The powder collected is dried for 12 hours in a stove at 95° C. 10 mg of powder are then placed in a 100-ml autoclave (enclosure likely to withstand temperatures of the order of 200° C. and pressures of the order of 5 bars) in the presence of 150 μl demineralized water. The autoclave is provided with a "basket" or "cell" system allowing the powder not to be in direct contact with the water introduced while soaking in steam. The autoclave is then brought to a temperature of 95° C. for 48 hours. The powder collected is thereafter dried in the stove at 95° C. for 12 hours. The powder is then calcined in air for 5 hours at 550° C. The solid is characterized by XRD, nitrogen volumetric analysis, mercury porosimetry, TEM, SEM, XF. The TEM analysis shows that the spherical particles that make up the material exhibit a core macroporosity characterized by 300 to 500-nm long and 100 to 200-nm wide domains, and a mesoporosity on the periphery of the particles characterized by 20 to 50-nm domains, the whole being characteristic of an organic-inorganic phase separation obtained by a spinodal decomposition mechanism present before the calcination stage. The presence of zeolitic entities in the walls of the material can also be clearly seen in the electron diffraction study of the microtome sections of thickness of the order of 70 nm in localized zones of the order of 100 nm. Nitrogen volumetric analysis combined with the $\alpha_s$ method analysis leads to a value of the micropore volume V$_{micro}$ of 0.35 ml/g (N$_2$), a value of the mesopore volume V$_{meso}$ of 0.6 ml/g (N$_2$) and a specific surface area of the final material S=700 m$^2$/g. The macroporous mercury volume defined by mercury porosimetry is 0.3 ml/g (the value of the mesoporous mercury volume also obtained by mercury porosimetry is in total accordance with the value obtained by nitrogen volumetric analysis). The wide-angle X-ray diffraction analysis leads to the diffractogram characteristic of the beta zeolite (micropore size, measured by XRD, of the order of 0.66 nm). The Si/Al molar ratio obtained by XF is 50. A SEM image of the spherical elementary particles thus obtained shows that these particles have a size characterized by a diameter ranging between 50 and 700 nm, the size distribution of these particles being around 300 nm.

Example 4 (Invention)

Preparation of a Material of Mesoporous and Macroporous Porosity, Whose Microporous Walls Consist of Crystallized Entities of Y (FAU) Zeolite and Having a Si/Al Molar Ratio=8

0.41 g of sodium aluminate (NaAlO$_2$) is added to a solution containing 0.17 g sodium hydroxide and 7.6 g of demineralized water. The mixture is left under stirring until the aluminium precursor is dissolved. 10 g of sodium silicate (27% by weight of SiO$_2$ and 14% NaOH) are then added under vigorous stirring. The mixture is kept under stirring for 18 hours at ambient temperature so as to obtain a clear solution. 15 ml of this solution are then added to a solution containing 35.2 g ethanol, 11.6 g water and 6.3 g surfactant F127 (pH value of the mixture=9.8). The V$_{inorganic}$/V$_{organic}$ ratio of the mixture is 0.24 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an O$_2$/N$_2$ mixture in PVC tubes. They are then fed into an oven set at a drying temperature of 250° C. The powder collected is thereafter dried for 12 hours in a stove at 95° C. 10 mg of powder are then placed in a 100-ml autoclave (enclosure likely to withstand temperatures of the order of 200° C. and pressures of the order of 5 bars) in the presence of 150 μl demineralized water. The autoclave is provided with a "basket" or "cell" system allowing the powder not to be in direct contact with the water introduced while soaking in steam. The autoclave is then brought to a temperature of 95° C. for 48 hours. The powder collected is dried in the stove at 95° C. for 12 hours. The powder is then calcined in air for 5 hours at 550° C. The solid is characterized by XRD, nitrogen volumetric analysis, mercury porosimetry, TEM, SEM, ICP and XF. The TEM analysis shows that the spherical particles that make up the material exhibit a core macroporosity characterized by 300 to 500-nm long and 100 to 200-nm wide domains, and a mesoporosity on the periphery of the particles characterized by 20 to 50-nm domains, the whole being characteristic of an organic-inorganic phase separation obtained by a spinodal decomposition mechanism present before the calcination stage. The presence of zeolitic entities in the walls of the material can also be clearly seen in the electron diffraction study of the microtome sections of thickness of the order of 70 nm in localized zones of the order of 100 nm. Nitrogen volumetric analysis combined with the $\alpha_s$ method analysis leads to a value of the micropore volume V$_{micro}$ of 0.33 ml/g (N$_2$), a value of the mesopore volume V$_{meso}$ of 0.8 ml/g (N$_2$) and a specific surface area of the final material S=720 m$^2$/g. The macroporous mercury volume defined by mercury porosimetry is 0.5 ml/g (the value of the mesoporous mercury volume also obtained by mercury porosimetry is in total accordance with the value obtained by nitrogen volumetric analysis). The wide-angle X-ray diffraction analysis leads to the diffractogram characteristic of the Y zeolite (micropore size, measured by XRD, of the order of 0.8 nm). The Si/Al molar ratio obtained by XF is 8. A SEM image of the spherical elementary particles thus obtained shows that these particles have a size characterized by a diameter ranging between 50 and 700 nm, the size distribution of these particles being around 300 nm.

The invention claimed is:
1. A hierarchical porosity material comprising at least two elementary spherical particles having a maximum diameter of 200 microns, at least one of said spherical particles comprises at least one matrix based on silicon oxide and exhibiting crystallized walls, said material having a macropore volume measured by mercury porosimetry ranging between 0.05 and 1 ml/g, a mesopore volume measured by nitrogen volumetric analysis ranging between 0.01 and 1 ml/g and a micropore volume measured by nitrogen volumetric analysis ranging between 0.03 and 0.4 ml/g.

2. A material as claimed in claim 1, such that the macropore volume measured by mercury porosimetry ranges between 0.1 and 0.3 ml/g.

3. A material as claimed in claim 1, such that the mesopore volume measured by nitrogen volumetric analysis ranges between 0.1 and 0.6 ml/g.

4. A material as claimed in claim 1, such that macroporosity is present in domains ranging between 50 and 1000 nm.

5. A material as claimed in claim 1, such that mesoporosity is present in domains ranging between 2 and 50 nm.

6. A material as claimed in claim 1, such that it exhibits mesoporosity-free elementary spherical particles.

7. A material as claimed in claim 1, such that said matrix has crystallized walls consisting of zeolitic entities.

8. A material as claimed in claim 7, such that said zeolitic entities comprise at least one zeolite selected from among the zeolites of MFI, BEA, FAU and LTA structural type.

9. A material as claimed in claim 1, such that said matrix based on silicon oxide is entirely silicic.

10. A material as claimed in claim 1, such that said matrix based on silicon oxide comprises at least one element X selected from among aluminium, iron, boron, indium and gallium.

11. A material as claimed in claim 10, such that element X is aluminium.

12. A material as claimed in claim 1, such that said elementary spherical particles have a diameter ranging between 50 nm and 10 microns.

13. A material as claimed in claim 1, such that it has a specific surface area ranging between 100 and 1100 $m^2/g$.

14. A method of preparing a material as claimed in claim 1, comprising: a) preparing a clear solution containing the zeolitic entity precursor elements comprising at least one structuring agent, at least one silicic precursor and optionally at least one precursor of at least one element selected from the group consisting of aluminium, iron, boron, indium and gallium; b) mixing into a solution at least one surfactant and at least said clear solution obtained in stage a); c) aerosol atomizing said solution obtained in stage b) so as to lead to the formation of spherical droplets; d) drying said droplets; e) autoclaving the particles obtained in stage d); f) drying said particles obtained in stage e); and g) eliminating said structuring agent and said surfactant so as to obtain a hierarchical porosity crystallized material in the said microporosity, mesoporosity and macroporosity range.

15. A method as claimed in claim 14, wherein said element is aluminium.

16. A method as claimed in claim 14, wherein said surfactant is a three-block copolymer, each block consisting of a poly(alkylene oxide) chain.

17. A method as claimed in claim wherein said three-block copolymer consists of two poly(ethylene oxide) chains and of one poly(propylene oxide) chain.

18. An adsorbent comprising the hierarchical porosity material as claimed in claim 1.

19. A catalyst comprising the hierarchical porosity material as claimed in claim 1.

* * * * *

UNITED STATES PATENT AND TRADEMARK OFFICE
CERTIFICATE OF CORRECTION

| | | |
|---|---|---|
| PATENT NO. | : 8,685,366 B2 | Page 1 of 1 |
| APPLICATION NO. | : 12/676696 | |
| DATED | : April 1, 2014 | |
| INVENTOR(S) | : Alexandra Chaumonnot et al. | |

It is certified that error appears in the above-identified patent and that said Letters Patent is hereby corrected as shown below:

In the Claims:

Column 20, line 22 (Claim 17), reads as follows: -- 17. A method as claimed in claim wherein said three-block --

Should read as: -- 17. A method as claimed in claim 16, wherein said three-block --

Signed and Sealed this
Nineteenth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,685,366 B2
APPLICATION NO. : 12/676696
DATED : April 1, 2014
INVENTOR(S) : Chaumonnot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 774 days.

Signed and Sealed this
Twenty-ninth Day of September, 2015

Michelle K. Lee
*Director of the United States Patent and Trademark Office*